Patented Feb. 7, 1933

1,896,753

UNITED STATES PATENT OFFICE

ELOI RICARD AND HENRI MARTIN GUINOT, OF MELLE, FRANCE, ASSIGNORS TO SOCIETE ANONYME DES DISTILLERIES DES DEUX-SEVRES, OF MELLE, FRANCE

SACCHARIFICATION OF WOOD AND OTHER CELLULOSIC MATERIALS

No Drawing. Application filed April 29, 1929, Serial No. 359,174, and in Belgium May 14, 1928.

This invention relates to the saccharification of wood and other cellulosic materials.

The saccharification of cellulose by means of mixtures of organic and inorganic acids is known. Thus in the specification of French Patent No. 541,048 of the 13th September 1921 of the Vereinigte Chemische Werke Aktiengesellschaft and Karl Ludeke, it is proposed to utilize, for dissolving and saccharifying cellulose, mixtures in which the inorganic acids are smaller in quantity than the organic acids. At the present time, however, no industrial process based on these principles has been successful on acount of a number of reasons, the chief of which are the following:—

1. Insufficient activity of the reagent utilized, particularly when acetic acid or its higher homologues are employed, or again when acids are used containing a certain quantity of water. It is then necessary to employ a considerable proportion of mineral acid (more than 10%) which leads to the serious disadvantages which are inherent in the old processes in which inorganic aqueous acid solutions are utilized (attack on apparatus, destruction of sugars and the like) and nevertheless involves the necessity of recovering a large quantity of expensive organic acid added in excess.

2. The impossibility of obtaining, by simple distillation in vacuo, a satisfactory recovery of the organic acid utilized for the saccharification. It is, in fact, very difficult to heat uniformly in vacuo a bad heat-conducting mass such as sawdust for example, and, on the other hand, the residue consisting of lignin and sugars retains very tenaciously considerable quantities of acids which then pass into aqueous solution, are neutralized and finally lost.

The object of the present invention is the complete elimination of these difficulties. It consists in acting upon the completely dried cellulosic material, either pure or mixed with other products, so as to convert it into cellulose formates with anhydrous or highly concentrated formic acid in the presence of a small quantity of catalyst acids or salts, and instead of separating the formates obtained from the mass, hydrolyzing them directly, in a sufficiently concentrated formic medium by the progressive addition of a small quantity of water whilst preferably assisting the reaction by stirring and heating. When a sample taken from the viscous mass no longer gives a precipitate when poured into cold water, the operation is complete. It is then sufficient to complete the conversion of the dextrine into sugars by employing the usual method consisting of boiling, in the open air or under pressure, the product of reaction brought into dilute aqueous solution, after having added, if necessary, a supplementary quantity of mineral acid.

The invention further comprises a process for recovering the formic acid employed for the saccharification. This process consists in extracting the acid after the first hydrolysis, by (1) distillation in the presence of a liquid insoluble or but slightly soluble in water and capable of giving with the formic acid an azeotropic mixture, or (2) by distillation in the presence of an alcohol giving with the formic acid a volatile formate which is subsequently saponified in order to recover the acid and the alcohol which again enter into the manufacturing cycle, or (3) after having brought the formic acid into aqueous solution with the sugars, extracting it by methodical exhaustion in counter-current by means of solvents insoluble or but slightly soluble in water. Any of these three modifications which permit of continuous working and a complete recovery of the acid may be utilized indifferently.

As regards the actual formylation operation, there may be used as catalysts either such acids as sulphuric hydrochloric, phosphoric, sulphurous, benzene-sulphonic, toluene-sulphonic acid and the like, or salts such as chloride of zinc, of calcium, of iron, bisulphates and generally all the catalysts already indicated and used for the preparation of cellulose esters.

It is advisable to apply heat in order to facilitate the action on the cellulose by the formic reagent; it will be understood that this heating may be conducted with considerably less precaution than if it was a question of preparing and then effectively separating the formates themselves with a view to their industrial utilization.

In addition, the preparation of fermentable sugars being definitely the object of the present invention, it will clearly be immaterial if a small quantity thereof is produced during the formylation stage. Thus the operation may be conducted very rapidly, for example by heating up to 70–80° C. and even more, according to the nature of the catalyst used; in these circumstances, the formic reagent can act even upon the "lignin hydrochloride" which may give a considerable proportion of fermentable reducing sugars.

In order to render the action on the cellulose by the formic acid even more rapid, the cellulose may also be subjected to preliminary treatment by dilute solutions of mineral acid so as to convert it more or less thoroughly into hydro-cellulose, in the manner known in the manufacture of cellulose esters. The concentration as well as the temperature of the reacting acid solutions may be varied.

This method of procedure is particularly recommended when it is a question of treating wood with a view to subsequent fermentation of the sugars obtained. In fact, this preliminary treatment brings about the conversion of the pentosans into pentoses which may be eliminated and converted into furfurol, a valuable product. On the other hand, if these same pentoses were to remain in the wood during saccharification, they would be partially converted into furfurol and ulmic products all acting as toxic bodies towards yeasts or certain micro-organisms and thus causing difficulties in the fermentation.

The operation may for example be effected in the following manner:—

In a diffusion battery of any type, consisting of separate elements, wood is placed which has previously been brought to the desired state of division. A methodical circulation is set up with a boiling 5% aqueous solution of sulphuric acid (it is also possible to utilize bisulphate of soda or potash or any other acid reagent capable of hydrolyzing the pentosans).

The insoluble pentosans gradually become converted into soluble pentoses; the extraction is quantitative and, with a battery composed of a sufficient number of elements, there is obtained on the one hand wood containing no more pentosans and on the other hand a solution of pentoses which is rich in reducing sugars, i. e., containing 200 grams or more per litre. This solution constitutes a raw material particularly suitable for the preparation of furfurol or the fermentation of pentoses contained therein. The wood, after being washed and dried, is ready for saccharification.

We have also found that, for effecting saccharification, it is feasible, instead of causing cellulosic materials to be acted upon by anhydrous or considerably concentrated acid in a liquid condition, to operate formylation and hydrolysis of said cellulosic materials, by employing vapours of anhydrous or highly concentrated formic acid for the former operation and vapours of hydrated formic acid or of a more or less dilute formic acid (for example, with vapours of the maximum boiling point mixture of water and formic acid) or steam for the latter operation. If necessary it is possible to work under reduced pressure to facilitate the work, when effecting the formylation or hydrolysis at a temperature below the boiling point of the anhydrous or hydrated acid.

The subsequent treatment of the saccharified substance and particularly the removal of the small quantity of formic acid which it retains is effected in the above described manner.

The following examples will clearly illustrate the manner in which the invention can be carried into effect:—

*Example 1*

100 grams of paper pulp containing 4% moisture are treated with 400 cc. anhydrous formic acid containing 2% sulphuric acid, and then heating to 75–80° C. The action on the cellulose is rapid; after two hours the conversion into formate is substantially complete. There is then gradually added 25 ccs. of water whilst stirring briskly and maintaining the temperature. There upon three fresh additions of 25 ccs. of water are effected at intervals of half an hour. The whole of the formic solution is poured into a large quantity of water—no precipitate is formed; finally the conversion of the dextrine into sugars is completed by heating to 130° C. for half an hour after the addition of 25 grams of sulphuric acid.

The yield of reducing sugars corresponds to 112 grams expressed as glucose and thus approximates to the theoretical, taking into account the water preexisting in the starting material.

*Example 2*

In a special apparatus provided with a stirring device there is placed 100 kgs. of dried sawdust, preferably depentosed, which is treated with 200 kgs. of anhydrous formic acid containing 4 kgs. of sulphuric acid at 66° Bé. (2%). The whole is heated in the neighbourhood of 80° C. for six hours and 25 litres of water are then gradually added to the mass whilst constantly stirring and maintaining the temperature.

The actual saccharification is then finished. The sugars are extracted by methodical washing with the minimum of water and the formic acid is then separated either by extraction with the aid of solvents or by distillation in the presence of an alcohol. There then remains an aqueous solution of sugars the hydrolysis of which is completed by boiling with the addition, if necessary, of a small quantity of mineral acid.

There is thus obtained a sugar solution which, after neutralization, readily ferments and with which alcohol, butylic alcohol and acetone, butyric acid, lactic acid, and the like can be produced.

The output of reducing sugars varies with the kind of wood used, the duration of the heating and the mode of operation, but it is always excellent and generally corresponds to a production of 25 to 35 litres of pure alcohol for every 100 kgs. of dry sawdust depentosed.

The lignin remaining as residus may be carbonized, burnt or turned to account in any manner.

*Example 3*

This example relates to a modification of the process described in the preceding example, in which, after having effected the formylation and the first hydrolysis of the cellulose, the formic acid saturating the lignin is recovered by sending into the mass, heated and stirred, vapours of benzene (B. P. 80.2° C.) which carry with them the acid in the form of a binary azeotropic mixture, boiling at 71° C. and containing about 31 parts of formic acid.

This mixture separates into two layers the lower layer (about 21%) consisting of anhydrous acid (except at the commencement of the distillation) containing a small quantity of benzene (10%) in solution. This lower layer may be used directly for a subsequent saccharification or may be treated with a view to obtaining anhydrous and pure formic acid. The sugar-charged lignin obtained as residue, is taken up again by the water; the benzene, if any remains, is separated by decantation and recovered; finally, the hydrolysis is completed in the usual manner.

What we claim is:

1. A process for the saccharification of wood or other cellulose material, comprising (a) converting the cellulose into formates of cellulose by acting thereon with highly concentrated formic acid in the presence of a small quantity of any of the salts and acids known to act as catalysts in the preparation of cellulose esters and preferably with the application of heat so as to accelerate the formylation reaction, and (b) directly hydrolzing the formates obtained, without separating them from the mass, by the progressive addition to the concentrated formic medium of small quantities of water, whilst preferably assisting the reaction by stirring and heating.

2. A process for the saccharification of wood or other cellulose material comprising (a) converting the cellulose into formates of cellulose by acting thereon with highly concentrated formic acid in the presence of a small quantity of any of the acids and salts known to act as catalysts in the preparation of cellulose esters and preferably with the application of heat so as to accelerate the formylation reaction, (b) directly hydrolyzing the formates obtained without separating them from the mass, by the progressive addition to the concentrated formic medium of small quantities of water, whilst preferably assisting the reaction by stirring and heating and (c) completing the hydrolysis by boiling the sugars and dextrine in aqueous solution in the presence of a mineral acid.

3. A process for the saccharification of wood or other cellulose material, which comprises converting the cellulose into formates of cellulose by acting on the cellulose with highly concentrated formic acid, and then directly hydrolyzing the formates.

4. A process for the saccharification of wood or other cellulose material, which comprises converting the cellulose into formates of cellulose by acting on the cellulose with highly concentrated formic acid, then directly hydrolyzing the formates, and completing the hydrolysis by boiling the sugars and dextrine in the presence of a small quantity of mineral acid.

5. A process for the saccharification of wood or other cellulose material, which comprises converting the cellulose into formates of cellulose by acting on the cellulose with highly concentrated formic acid, then directly hydrolyzing the formates, then removing the formic acid, and thereafter completing the hydrolysis by boiling the sugars and dextrine in aqueous solution in the presence of a small quantity of mineral acid.

6. In a process as set forth in claim 5, removing the formic acid by distillation in the presence of a liquid forming therewith an azeotropic mixture.

7. In a process as set forth in claim 5, removing the formic acid by distillation in the presence of an alcohol capable of forming a volatile formate, separating the said formate and saponifying it to regenerate the formic acid and the alcohol.

8. In a process as set forth in claim 5, removing the formic acid by causing it to go into solution together with the sugars and then methodically extracting it by means of solvents insoluble or but slightly soluble in water.

9. In a process as set forth in claim 5, removing the formic acid by causing it go into solution together with the sugars and then methodically extracting it in countercurrent by means of solvents insoluble or but slightly soluble in water.

10. In a process as set forth in claim 3, preliminarily treating the material to be saccharified with a dilute mineral acid to produce hydrocellulose for the purpose of facilitating the subsequent saccharification.

11. In a process as set forth in claim 3, preliminarily treating the material to be saccharified with a dilute mineral acid to produce hydrocellulose for the purpose of facilitating the subsequent saccharification, and removing the pentoses formed by this treatment before the formylation of the cellulose.

12. In a process for the saccharification of wood or other cellulose material, preliminarily treating the material with dilute mineral acid, removing the pentoses thus formed, converting the cellulose into formates with formic acid, acting also on the residual lignin of the wood by treatment with formic acid, and hydrolyzing the formates obtained in order to produce fermentable reducing sugars.

13. In a process as set forth in claim 3, effecting the formylation of the cellulose material and the hydrolysis of the cellulosic ester formed, by employing vapours of the highly concentrated formic acid for the former operation and vapours of hydrated formic acid for the latter operation.

14. A process for the saccharification of wood or other cellulose material according to claim 5 in which the removal of the formic acid is obtained by distilling the product resulting from the first hydrolysis in the presence of an alcohol capable of forming a volatile formate, and separating the formate thus formed.

15. A process for the saccharification of wood or other cellulose material, which comprises converting the cellulose into formates of cellulose by acting on the cellulose with highly concentrated formic acid, then directly hydrolyzing the formates, then sending into the mass vapours of benzene, which carry with them the formic acid in the form of a binary azeotropic mixture, and thereafter completing the hydrolysis by boiling the sugars and dextrine in the presence of a small quantity of mineral acid.

In testimony whereof we have signed this specification.

ELOI RICARD.
HENRI MARTIN GUINOT.